O. R. ALTWEIN.
CHUCK JAWS.
APPLICATION FILED MAY 24, 1910.
982,559.
Patented Jan. 24, 1911.
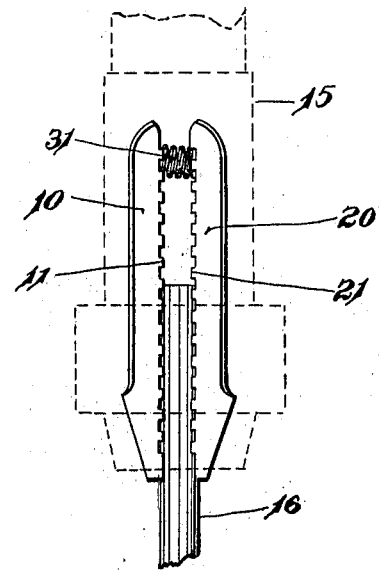
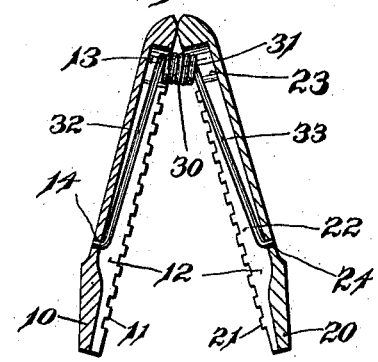
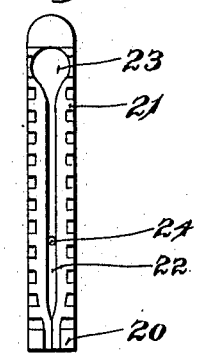
Witnesses:
Louis Lucia
G. B. Lynch
Inventor:
Oscar R. Altwein.
by J. E. Hart
his attorney

UNITED STATES PATENT OFFICE.

OSCAR R. ALTWEIN, OF SOUTHINGTON, CONNECTICUT, ASSIGNOR TO THE PECK, STOW AND WILCOX COMPANY, OF SOUTHINGTON, CONNECTICUT, A CORPORATION OF CONNECTICUT.

CHUCK-JAWS.

982,559.  Specification of Letters Patent.  Patented Jan. 24, 1911.

Application filed May 24, 1910. Serial No. 563,136.

*To all whom it may concern:*

Be it known that I, OSCAR R. ALTWEIN, a citizen of the United States, and a resident of Southington, in the county of Hartford, State of Connecticut, have invented certain new and useful Improvements in Chuck-Jaws, of which the following is a specification.

Referring to the drawings: Figure 1 is a side elevation of the jaws embodying my invention. Fig. 2 is a similar view in a central section. Fig. 3 is an inside view of one of the jaws.

In the preferred embodiment of my invention which is illustrated in the drawings, 10—20 denote the jaws preferably having their inner or opposing surfaces serrated transversely as at 11—21, and grooved longitudinally as at 12—22 to provide suitable grip portions for the tool shank. The outer ends of the jaws are so shaped that when they are engaged by the jaw closing sleeve 15, indicated in dotted lines in Fig. 1, they are forced toward each other on to the tool shank 16 to grip and hold it. It is customary to connect the jaws by a spring which will normally throw their outer ends away from each other, with the result that when the sleeve is unscrewed to release the jaws, they move away from one another under the impulse of the spring, releasing the grip on the tool shank and permitting of its withdrawal. My invention relates particularly to the form of spring used and the manner of connecting the jaws by the spring.

30 denotes in general the spring used. It has a central coiled portion 31, whose ends lie in sockets 13—23 on the inner faces of the inner ends of the jaws 10—20. Arms 32—33 extend laterally from the axis of the coiled portion of the spring, lying in the bottom of the grooves in the inner faces of the jaws, the ends of these arms being bent outwardly and engaging recesses 14—24 in the jaws.

In operation it will be seen that while the spring normally tends to draw the inner ends of the jaws together and throw their outer ends apart forming a substantially V opening between the jaws, when the jaws are closed on to a tool shank, and especially a shank of large diameter, the inner ends of the jaws are free to separate so that when the jaws are closed on to the shank of the tool by the sleeve the inner faces are substantially parallel, thus giving an even grip throughout the length of that part of the tool shank which is between the jaws.

I claim:—

1. The combination with a pair of chuck jaws, of a coiled spring located between the inner ends of said jaws and arranged transversely, and arms extending laterally from said spring toward the outer ends of said jaws and interengaged with said jaws.

2. The combination with a pair of coöperating chuck jaws recessed on the inner faces near their inner ends, of a coiled spring arranged transversely between the inner ends of said jaws, the ends of said coiled spring being located in said recesses, and arms extending from said coil toward the outer ends of said jaws and engaged therewith.

3. The combination with a pair of coöperating chuck jaws, of means for connecting said jaws, said means consisting of a coiled spring and arms projecting laterally in the same direction from each end of said spring and engaged with said jaws.

OSCAR R. ALTWEIN. [L. S.]

Witnesses:
W. R. CARROLL,
L. E. TICHTHORN.